United States Patent [19]

Hsieh et al.

[11] 4,131,653

[45] Dec. 26, 1978

[54] EPOXIDIZED BLOCK COPOLYMERS

[75] Inventors: Henry L. Hsieh; Kishore Udipi, both of Bartlesville, Okla.

[73] Assignee: Phillips Petroleum Company, Bartlesville, Okla.

[21] Appl. No.: 832,121

[22] Filed: Sep. 9, 1977

[51] Int. Cl.² ............................................. C08F 297/04
[52] U.S. Cl. ................................ 260/880 B; 260/879; 526/20
[58] Field of Search .......................... 260/879, 880 B; 526/308, 20, 21, 55

[56] References Cited

U.S. PATENT DOCUMENTS

| 2,829,135 | 4/1958 | Greenspan | 526/21 |
|---|---|---|---|
| 2,921,921 | 1/1960 | Greenspan | 526/21 |
| 3,022,322 | 2/1962 | Wheelock | 526/20 |
| 3,269,978 | 8/1966 | Short | 526/21 |
| 3,699,184 | 10/1972 | Taylor | 260/880 B |
| 3,723,400 | 3/1973 | Dolgoplosk | 526/308 |
| 3,740,382 | 6/1973 | Dolgoplosk | 526/308 |
| 4,020,251 | 4/1977 | Hsieh | 526/20 |
| 4,051,199 | 9/1977 | Udipi | 260/880 R |

Primary Examiner—Paul R. Michl

[57] ABSTRACT

Copolymers produced by polymerization of a mixture comprising a 1,3-cyclodiene, an acyclic conjugated diene, and, optionally, a vinyl aromatic compound are epoxidized to form epoxidized copolymers exhibiting improved green tensile strength, moduli, and oil resistance properties in comparison with the unepoxidized parent copolymers.

15 Claims, No Drawings

EPOXIDIZED BLOCK COPOLYMERS

This invention relates to epoxidized block copolymers exhibiting improved physical properties. In accordance with another aspect, this invention relates to epoxidized block copolymers produced by the polymerization of a mixture comprising a 1,3-cyclodiene and an acyclic conjugated diene. In accordance with a further aspect, this invention relates to epoxidized block copolymers produced by polymerization of a mixture comprising a 1,3-cyclodiene, an acyclic conjugated diene, and a vinyl aromatic compound. In accordance with a still further aspect, this invention relates to a process for improving the green tensile strength, moduli, and oil resistance properties of block copolymers of 1,3-cyclodienes by epoxidizing the block copolymers.

Copolymers of cyclodienes with acyclic conjugated dienes, and, optionally, with vinyl aromatic compounds are disclosed in the prior art. The present invention is directed to a process for improving the physical properties of the known block copolymers by epoxidation and to the resulting novel epoxidized block copolymers.

Accordingly, an object of this invention is to produce novel epoxidized copolymers.

Another object of this invention is to produce epoxidized copolymers from 1,3-cyclodiene and acyclic conjugated diene monomers.

A further object of this invention is to produce epoxidized copolymers from 1,3-cyclodienes, acyclic conjugated dienes, and vinyl aromatic compounds.

A further object of this invention is to provide epoxidized block copolymers exhibiting improved physical properties.

A still further object of this invention is to provide a process for improving the physical properties of copolymers of 1,3-cyclodienes.

Other objects, aspects, and the several advantages of this invention will be apparent to one skilled in the art upon a study of the disclosure and the appended claims.

According to the invention, there is provided novel epoxidized copolymers of 1,3-cyclodienes, acyclic conjugated dienes, and, optionally, vinyl aromatic compounds, which copolymers exhibit improved physical properties in comparison with the parent unepoxidized copolymers.

In accordance with one embodiment, this invention relates to epoxidized block copolymers produced by the polymerization of 1,3-cyclodiene and butadiene.

In accordance with another embodiment, this invention relates to novel epoxidized copolymers of 1,3-cyclohexadiene, butadiene, and styrene.

In accordance with a still further embodiment, this invention relates to a process for improving the physical properties of copolymers of 1,3-cyclodienes by subjecting the copolymer to epoxidation under conditions such as to produce an epoxidized block copolymer having improved green tensile strength, moduli, and oil resistance properties in comparison with the unepoxidized parent copolymer.

1,3-Cyclodienes suitable for use in the present invention are represented by the general formulas

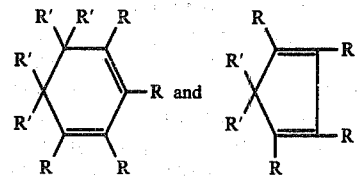

wherein R can be hydrogen, methyl, or ethyl. The R groups can be the same or different. R' can be hydrogen, an alkyl group either straight or branched, or cycloalkyl or aryl such that the maximum number of carbon atoms per R' group is about 6. The R' groups can be the same or different. The total number of carbon atoms in the 1,3-cyclodiene monomer can range from about 5 to about 20. Examples of such compounds include 1,3-cyclopentadiene, 2-methyl-1,3-cyclopentadiene, 5-ethyl-1,3-cyclopentadiene, 1,3-cyclohexadiene, 1-ethyl-1,3-cyclohexadiene, 1,4-dimethyl-5-isopropyl-1,3-cyclohexadiene, 2,3-dimethyl-5,6-diphenyl-1,3-cyclohexadiene, 2,3-diethyl-5-(n-butyl)-6-phenyl-1,3-cyclohexadiene, and 1-methyl-5-cyclohexyl-1,3-cyclohexadiene.

Suitable acyclic conjugated dienes employed in the invention are those of about 4 to 12, preferably 4 to 8, carbon atoms per molecule. Examples of these include 1,3-butadiene, isoprene, piperylene, 2-methyl-1,3-pentadiene, 2,3-dimethyl-1,3-butadiene, 1,3-octadiene, and 5,6-diethyl-1,3-octadiene.

It is within the scope of the invention to include a vinyl aromatic compound in the polymerization mixture along with the other monomers. The vinyl aromatic compounds generally tend to increase the resinous character of the resulting copolymers; consequently, whether to include a vinyl aromatic compound depends to a large extent upon the properties desired in the resultant copolymer. The vinyl aromatic compounds suitable for use in the invention range in carbon number from about 8 to 14 and include styrene and various alkylstyrenes such as 4-ethylstyrene, and such as 1-vinylnapthalene.

It is also within the scope of this invention to employ mixtures of cyclodienes and/or mixtures of acyclic conjugated dienes and/or mixtures of vinyl aromatic compounds.

The copolymers produced are block copolymers, whether or not a vinyl aromatic compound is included in the monomer mixture. If a vinyl aromatic compound is included in the monomer mixture, 1,3-cyclodiene acts as a randomizer for the vinyl aromatic compound/acyclic conjugated diene mixture and then adds on as a block.

The weight ratios of the monomer units in the copolymer vary widely. The weight ratio of acyclic conjugated diene units to cyclodiene units is generally in the range of from about 99:1 to 1:99, more generally 95:5 to 40:60. The weight ratio of acyclic conjugated diene units to vinyl aromatic compound units is generally in the range of from about 100:0 to 1:99, more generally 100:0 to 50:50. A substantial percentage by weight of the acyclic conjugated diene units of the copolymers is in the trans and vinyl configurations. Generally, the percentage of acyclic conjugated diene units in the trans and vinyl configurations is in the range of from about 9 to 99 percent by weight of the copolymer, and, the lower the cis content, or said another way, the higher the trans and vinyl content, the greater the resinous character of the copolymer.

Various organolithium compounds are suitable as polymerization initiators in accordance with this invention. These compounds have the formula R"Li$_x$, wherein R" is a hydrocarbon radical selected from the group consisting of aliphatic, cycloaliphatic, and aromatic radicals and x is an integer of 1 to 4, inclusive. The R" in the formula has a valence equal to the integer x and generally contains from 1 to 20, inclusive, carbon atoms, although higher molecular weight compounds can be utilized. Examples of suitable organolithium compounds include methyllithium, isopropyllithium, n-butyllithium, t-octyllithium, n-decyllithium, phenyllithium, 1-naphthyllithium, 4-butylphenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butene, 1,8-dilithio-3-decene, 1,4-dilithiobenzene, 1,5-dilithionaphthalene, 1,2-dilithio-1,2-diphenylethane, 9,10-dilithio-9,10-dihydroanthracene, 1,2-dilithio-1,8-diphenyloctane, 1,3,5-trilithiopentane, 1,5,15-trilithioeicosane, 1,3,5-trilithiocyclohexane, 1,2,5-trilithionaphthalene, 1,3,5-trilithioanthracene, 1,3,5,8-tetralithiodecane, 1,5,10,20-tetralithio-eicosane, 1,2,3,5-tetralithiocyclohexane, and 1,2,3,5-tetralithio-4-hexyl-anthracene.

Other suitable organolithium initiators are the alphalithio multisubstituted dialkylbenzenes and corresponding oligomers which can be prepared by the reaction of an organomonolithium compound, such as described above, with a multivinyl aromatic compound such as 1,2-divinylbenzene, 1,3-divinylbenzene, 1,4-divinylbenzene, 1,2,4-trivinylbenzene, 1,3-divinylnaphthalene, 1,8-divinylnaphthalene, 1,3,5-trivinylnaphthalene, 2,4-divinylbiphenyl, 3,5,4'-trivinylbiphenyl, 1,3-divinyl-4,5,8-tributylnaphthalene, and the like. Divinyl aromatic hydrocarbons containing up to 18 carbon atoms per molecule are preferred, particularly divinylbenzene as either the ortho, meta, or para isomer, and commercial divinylbenzene, which is a mixture of isomers, also is quite satisfactory. These multifunctional polymerization initiators are usually used as a mixture in a suitable solvent; however, the mixture is primarily 1,3-bis(1-lithio-3-methylpentyl)benzene referred to herein as DiLi-3.

Other multifunctional polymerization initiators can be prepared by utilizing an organomonolithium compound further together with a multivinyl aromatic compound plus either a conjugated diene or monovinyl aromatic compound or both. These ingredients can be contacted together in a hydrocarbon or a mixture of a hydrocarbon and a polar organic compound as diluent. Alternatively, a multifunctional polymerization initiator can be prepared in a two-step process by reacting an organomonolithium compound with a conjugated diene or monovinyl aromatic compound and then adding the multivinyl aromatic compound. The ratio of conjugated diene or monovinyl aromatic compound additive employed should be in the range of about 2 to 15 moles of polymerizable compound per mole of organolithium compound. The amount of multivinyl aromatic compound employed should be in the range of about 0.05 to 2 moles per mole of organomonolithium compound.

Additional information regarding the above-described multifunctional polymerization initiators can be found in U.S. Pat. No. 3,668,263, Morrison et al. (1972), and U.S. Pat. No. 3,776,964, Morrison et al. (1973).

Other types of multifunctional initiators can be employed, such as those prepared by contacting a sec- or tert-organomonolithium compound with 1,3-butadiene, in a ratio of such as about 2 to 4 moles of organomonolithium compound per mole of 1,3-butadiene, in the absence of added polar material in this instance, with the contacting preferably being conducted in an inert hydrocarbon diluent, although contacting without the diluent can be employed, if desired.

The amount of initiator employed depends upon the polymer molecular weight desired and thus varies widely. Generally the amount of initiator is in the range of about 0.1-100 milliequivalents per 100 grams of total monomer. The multilithium initiators are preferred for use in synthesizing the inventive polymers. The use of such initiators promotes higher molecular weight and tougher polymers.

The polymerization process is usually carried out in the presence of a diluent. Diluents suitable for use in the process are hydrocarbons which are not detrimental to the polymerization process. Suitable diluents include paraffinic, cycloparaffinic, and aromatic hydrocarbons and mixtures thereof. Suitable solvents include, for example, n-heptane, 2,2,4-trimethylpentane, cyclopentane, cyclohexane, benzene, toluene, and the xylenes. Cycloaliphatic hydrocarbons are preferred.

The inclusion with the diluent of from about 0.01 to 50, preferably 0.1-10, parts by weight per 100 parts by weight monomer of an ether or a tertiary amine is preferred in order to increase the polymerization rate and to increase the degree of conversion. Suitable ethers include cyclic and acyclic ethers, for example, tetrahydrofuran, dioxane, dimethyl ether, diethyl ether, di-n-butyl ether, ethyl n-butyl ether, anisole, and diphenyl ether. Suitable tertiary amines include triethylamine, tri-n-propylamine, N,N-dimethylethylamine, N,N-dimethylaniline, and N,N,N',N'-tetramethylethylenediamine.

The polymerization reaction can be carried out under autogenous pressure or at any suitable pressure sufficient to maintain the reaction mixture substantially in the liquid phase. The pressure will thus depend generally upon the particular diluent being employed and the temperature at which the polymerization is carried out. However, higher pressures can be employed if desired, these pressures being obtained by some suitable method such as pressurization of the reactor with a gas which is inert with respect to the polymerization reaction. The polymerization temperature can vary broadly but generally it is in the range of from about −15° C. to 150° C., preferably from about 0° C. to 70° C.

The time required for the polymerization is dependent upon such factors as the molecular weight desired, quantity of catalyst employed, temperature, and the like, but generally will range from a few minutes to as much as 48 hours, although longer polymerization periods can be employed. The process can be carried out batchwise or as a continuous process. The latter favors higher randomization. Various substances are known to be detrimental to the catalyst composition of this invention. These substances include carbon dioxide, oxygen, and water. It is highly desirable, therefore, that the reactants be freed of these materials as well as any other materials which tend to inactivate the catalyst. Any of the known methods for removing such contaminants can be used. Also, when a diluent is employed in the process, it is preferred that this material be substantially free of impurities such as water, oxygen, and carbon dioxide. In this connection, it is desirable to remove the air and moisture from the reaction vessel in which the polymerization is conducted. Although it is preferred to carry out the polymerization under anhydrous or substantially anhydrous conditions, it is to be understood that some small amounts of these catalyst-inactivating materials can be tolerated in the reaction mixture. However, it is also to be understood that the amount of such materials which can be tolerated is insufficient to cause complete deactivation of the catalyst.

At the completion of the polymerization reaction, the total reaction mixture can be treated to inactivate the catalyst and to precipitate the polymer. Alternatively, the epoxidation reaction (described below) can be conducted on the polymerization reaction mixture, and then polymer isolation conducted. Any suitable method can be utilized for carrying out this treatment of the reaction mixture. In one suitable method, the catalyst-inactivating agent, such as water or an alcohol, is added to the mixture so as to inactivate the catalyst and cause precipitation of the polymer. The polymer is then separated from the alcohol or water and diluent by any suitable means such as decantation or filtration. It is often preferred to add initially only an amount of the catalyst-inactivating agent which is sufficient to inactivate the catalyst without causing precipitation of the dissolved polymer. It has also been found advantageous to add an antioxidant, such as 2,6-di-t-butyl-4-methyl-phenol, to the polymer mixture prior to precipitation of the polymer. After addition of the catalyst-inactivating agent and the antioxidant, the polymer present in the solution can then be separated by the addition of an excess of an agent such as ethyl alcohol or isopropyl alcohol. When an alcohol is used as a catalyst-inactivating agent, it also functions to precipitate the polymer. In the event other catalyst-inactivating agents are employed, which do not perform this dual role, a suitable agent such as an alcohol can be added to precipitate the polymer. It is, of course, to be realized that it is within the scope of the invention to employ other suitable means to recover the polymer from solution such as, for example, steam stripping. After separation from the solvent mixture and alcohol by filtration or other suitable means, the polymer is dried.

The epoxidized copolymers of this invention can be prepared by the epoxidation procedures as generally described in the Encyclopedia of Polymer Science and Technology, Volume 6, page 83ff., and in U.S. Pat. No. 3,699,184.

The epoxidation is conducted in such a way as to substantially eliminate the possibility of epoxidizing any monovinylarene portions of the polymer, but under such conditions that the extent of epoxidation, as defined by the ratio of olefinic double bonds modified by the epoxidation reaction to the number of initial double bonds, can vary from 5 to 80 percent, preferably from 15 to 60 percent.

Epoxidation can be effected by generally known methods such as by reaction with organic peracids which can be preformed or formed in situ during the reaction. Preformed peracids suitable for use include such as peracetic and perbenzoic acids, while in situ formation is exemplified by the use of hydrogen peroxide in the presence of formic acid, or hydrogen peroxide in the presence of a low molecular weight monocarboxylic acid (or acid anhydride) such as acetic acid and a cationic exchange resin. In the latter case, the cationic exchange resin can be substituted by an alternate strong acid catalyst such as sulfuric acid, p-toluenesulfonic acid, or phosphoric acid. Alternatively, a mixture of formic acid and one or more monocarboxylic acids can be used, such as a 1:1 mixture of formic acid:acetic acid, in which case the strong acid catalysts as listed above are not required.

The low molecular weight monocarboxylic acids which are suitable include in addition to the preferred acetic acid those acids which are normally liquid at room temperature and which generally have 2 to 9 carbon atoms per molecule. Exemplary acids include chloroacetic acid, trifluoroacetic acid, propionic acid, isobutyric acid, n-valeric acid, caproic acid, caprylic acid, and the like.

The hydrogen peroxide solution used preferably contains about 30 percent or higher hydrogen peroxide. The amount of hydrogen peroxide used is preferably between one and two moles per mole of olefinic unsaturation in the polymer to be epoxidized, although an excess of hydrogen peroxide can be used if desired.

The epoxidation reaction can be conducted directly on the polymerization cement (polymer solution as formed), or, alternately, the recovered rubber polymer can be redissolved in an inert solvent which must be capable of dissolving the elastomer in its initiate state as well as after partially epoxidized and generally have boiling points in the range of 35° C. to 150° C., more preferably from about 60° C. to 100° C. Examples of suitable diluents include pentane, cyclopentane, hexane, 2-methylpentane, 2,2-dimethyl-butane, 2,3-dimethybutane, methylcyclopentane, cyclohexane, 2,4-dimethylpentane, 2,3-dimethylpentane, methylcyclohexane, heptane, and the like.

The reaction temperature of the epoxidation process is not critical and can vary from about −10° C. to 120° C.

The concentration of the polymer solution is limited only by practical considerations such as ease of handling of the viscous solution. In general, for polymers having a high molecular weight, it is preferable to work with solutions containing from 3 to 20 weight percent polymer concentration, while for polymers having a low molecular weight, solutions of polymers of up to 80 weight percent or higher polymer concentration can be used.

The time of the epoxidation reaction is normally 15 minutes to 4 hours or longer and depends on the concentration of the epoxidation recipe ingredients, the reaction temperature, the polymer composition, and the extent of epoxidation desired.

At the completion of the epoxidation step, the epoxidized polymer can be isolated by typical methods such as coagulation and steam stripping, as described in the preceding section. However, it may be desirable or advantageous to first destroy the residue epoxidation reagents by known means, such as by heating in an alkaline medium and by addition of reducing agents or peroxide decomposition catalysts.

The epoxidized copolymers of the instant invention can be compounded with stabilizers, antioxidants, fillers, pigments, reinforcing agents, and other such additives as may be required.

The epoxidized copolymers are suitable for such uses as hoses, belts, shoe soles, rubber bands, adhesives, and various molded or extruded articles.

EXAMPLES

A. Preparation of Copolymers of 1,3-Cyclohexadiene

The polymerizations were carried out under nitrogen is capped beverage bottles employed essentially anhydrous reactants and conditions. The charge order was diluent, monomers, ether, and initiator. The bottles were tumbled in a constant temperature bath for the stipulated polymerization times and at the stipulated temperatures. Following polymerization, 2,6-di-t-butyl-4-methylphenol (one part by weight per hundred parts by weight of total monomer) was added in a 50/50 volume toluene/isopropyl alcohol solution, the polymer solutions were filtered, and the polymers were coagulated by adding the filtrates to isopropyl alcohol. The polymers were then collected by filtration and dried under reduced pressure.

Polymers were prepared in accordance with Polymerization Recipe 1.

| Polymerization Recipe 1 | | | | |
|---|---|---|---|---|
| | Polymer Identification | | | |
| | A | B | C | D |
| Tetrahydrofuran, phm[a] | 5 | 5 | 5 | 5 |
| 1,3-Cyclohexadiene, phm | 25 | 40 | 15 | 50 |
| 1,3-Butadiene, phm | 50 | 40 | 50 | 50 |
| Styrene, phm | 25 | 20 | 35 | 0 |
| Cyclohexane, phm | 546 | 546 | 546 | 760 |
| DiLi-3[b], meqhm[c] | 4 | 4 | 4 | 4 |
| Polymerization Temp., °C | 30 | 30 | 30 | 30 |
| Polymerization Time, hrs. | 16 | 16 | 16 | 16 |

[a]Parts by weight per 100 grams of total monomer.
[b]Difunctional lithium catalyst, principally 1,3-bis(1-lithio-3-methylpentyl)benzene, as described herein and in Bulletin 192, Lithium Corporation of America, subsidiary of Gulf Resources and Chemical Corp., Bessemer City, NC 28016.
[c]Milliequivalents per 100 grams of total monomer.

Physical properties of the copolymers of 1,3-cyclohexadiene prepared according to Polymerization Recipe 1 are shown in Table I.

TABLE I

| Physical Properties of Copolymers of 1,3-Cyclohexadiene | | | | |
|---|---|---|---|---|
| | Polymers | | | |
| | A | B | C | D |
| Inherent viscosity[a] | 0.53 | 0.53 | 0.56 | 0.72 |
| Molecular weight $(M_w)$[b] | — | — | — | 87,000 |
| Molecular weight $(M_n)$[b] | — | — | — | 43,000 |
| Heterogeneity index[c] | — | — | — | 2.0 |
| Gel, weight percent[d] | 0 | 0 | 0 | 0 |
| Vinyl, percent[e] | 55.6 | 59.8 | 49.8 | — |
| Polymer yield, percent | 100 | 98.5 | 100 | 100 |

[a]Inherent viscosity was determined in accordance with the procedure described in U. S. Patent 3,278,508, column 20, Note (a) with the modification that the solution was not filtered through a sulfur absorption tube but rather a sample of the solution was filtered through a fritted glass filter stick of grade C porosity and pressured directly into the viscometer.
[b]Molecular weights were determined from gel permeation chromotography curves by a procedure described by G. Kraus and C. J. Stacy in J. Poly Sci.: Symposium 43, 329–343 (1973)and in J. Poly Sci. A-2, 10, 657 (1972).
[c]Quotient of the weight average molecular weight divided by the number average molecular weight.
[d]Gel determined according to procedure described in U. S. Patent 3,276,508, column 20, Note (b).
[e]Vinyl content determined by infrared analysis as generallydescribed in U. S. Patent 3,317,503, column 8, lines 26–39.

B. Epoxidation of Copolymers of 1,3-Cyclohexadiene

Copolymers prepared in Section A were epoxidized according to Epoxidation Recipe 2.

| Epoxidation Recipe 2 | |
|---|---|
| 1,3-Cyclohexadiene Copolymer, grams | 50 |
| Toluene, grams | 430 |
| Formic acid (88%), milliliters | 12 |
| Hydrogen peroxide (30%), milliliters | 26 |
| Reaction temperature, °C | 70 |
| Reaction time, hours | 3 |

The copolymer was dissolved in the toluene and the formic acid added to the stirred solution at 70° C. Hydrogen peroxide was then added dropwise with continued stirring over a period of 10 to 15 minutes. This mixture was stirred and maintained at 70° C. for a total of 2 hours. The epoxidized polymer was coagulated with isopropyl alcohol and purified by recoagulating one or more times from toluene with isopropyl alcohol. Prior to the final coagulation, 2,6-di-t-butyl-4-methylphenol (one part by weight per hundred parts of polymer) was added as a 10 weight percent solution in 50/50 (by volume) toluene/isopropyl alcohol. The coagulated polymer was dried under reduced pressure at 60° C. Table II shows the properties of the epoxidized copolymers prepared by this procedure.

TABLE II

| Properties of Eoxidized Copolymers of 1,3-Cyclohexadiene | | | | |
|---|---|---|---|---|
| | Epoxidized Polymer | | | |
| | E | F | G | H |
| Parent polymer[a] | A | B | C | D |
| Oxirane oxygen, weight %[b] | 6.1 | 5.15 | 4.89 | — |
| Total oxygen, weight %[c] | 11.2 | 10.4 | 8.70 | 8.67 |
| Gel, percent | 0 | 0 | 0 | — |
| Inherent viscosity | 0.59 | 0.60 | 0.52 | — |
| Extent of epoxidation, %[d] | 39.4 | 34.7 | 34.6 | — |

[a]Identification given in Polymerization Recipe 1 and Table I.
[b]Weight percent oxirane oxygen was determined in accordance with R. R. Jay, Anal. Chem. 36, 667–668 (1964).
[c]Weight percent oxygen was determined by activation analysis.
[d]Ratio of olefinic double bonds modified by the epoxidation reaction to the number of initial double bonds. This value is calculated from the known weight percent of the 1,3-butadiene and 1,3-cyclohexadiene present in the polymer, the weight percent oxirane oxygen, and the weight percent total oxygen. The difference between the weight percent total oxygen and the weight percent oxirane oxygen is assumed to be derived from acid hydrolyzed oxirane rings resulting in geminal hydroxy and acyloxy groups.

Tensile properties and oil resistance of the epoxidized and unepoxidized copolymers of 1,3-cyclohexadiene are shown in Table III.

Data in Table III illustrate the unexpected increase in green tensile strength and modulus which results from epoxidizing copolymers of 1,3-cyclohexadiene. The good oil resistance of these epoxidized copolymers is also shown.

TABLE III

| Tensile Properties and Oil Resistance of Epoxidized and Unepoxidized Copolymers | | | | | | | | |
|---|---|---|---|---|---|---|---|---|
| | Polymer Identification | | | | | | | |
| | A | E | B | F | C | G | D | H |
| Bd/Sty/CHD[a], weight percent | 50/25/25 | | 40/20/40 | | 50/35/15 | | 50/0/50 | |
| Epoxidized | NO | YES | NO | Yes | No | YES | NO | YES |
| Tensile strength (25° C), MPa[b] | 6.8 | 21.8 | 14.8 | 21.2 | [c] | 13.2 | 7.7 | 18.5 |
| Elongation (25° C), %[a] | 600 | 370 | 500 | 220 | [c] | 380 | 440 | 310 |
| 200% Modulus (25° C), MPa[b] | 1.8 | 10.3 | 7.4 | 19.8 | [c] | 6.5 | — | — |
| 300% Modulus (25° C), MPa[b] | — | — | — | — | [c] | — | 6.5 | 17.8 |

TABLE III-continued

<table>
<tr><th colspan="9">Tensile Properties and Oil Resistance of Epoxidized and Unepoxidized Copolymers</th></tr>
<tr><th></th><th colspan="8">Polymer Identification</th></tr>
<tr><th></th><th>A</th><th>E</th><th>B</th><th>F</th><th>C</th><th>G</th><th>D</th><th>H</th></tr>
<tr><td>% Swell after 7 days in oil at room temperature[d]:</td><td></td><td></td><td></td><td></td><td></td><td></td><td></td><td></td></tr>
<tr><td>ASTM Oil #1</td><td>4.1</td><td>0.7</td><td>2.2</td><td>0.9</td><td>c</td><td>0.4</td><td>9.1</td><td>1.6</td></tr>
<tr><td>ASTM Oil #2</td><td>9.5</td><td>0.6</td><td>4.9</td><td>0.8</td><td>c</td><td>0.7</td><td>11.0</td><td>2.2</td></tr>
<tr><td>ASTM Oil #3</td><td>e</td><td>3.0</td><td>e</td><td>2.3</td><td>c</td><td>2.5</td><td>86.8</td><td>13.4</td></tr>
<tr><td>Reference Fuel A</td><td>170</td><td>13.2</td><td>122</td><td>9.3</td><td>c</td><td>8.3</td><td>273.4</td><td>44.1</td></tr>
<tr><td>Reference Fuel B</td><td>e</td><td>121</td><td>e</td><td>151</td><td>c</td><td>e</td><td>—</td><td>—</td></tr>
<tr><td>Hardness, Shore A[f]</td><td>62</td><td>86</td><td>88</td><td>87</td><td>c</td><td>87</td><td>93</td><td>93</td></tr>
</table>

[a] Bd=1,3-butadiene; Sty=styrene; CHD=1,3-cyclohexadiene
[b] ASTM D 412-75.
[c] Rubber too weak to evaluate.
[d] ASTM D 471-75.
[e] Polymer dissolved.
[f] ASTM D 2240-75.

We claim:

1. An epoxidized block copolymer comprising:
   (a) units of a 1,3-cyclodiene represented by the general formulas

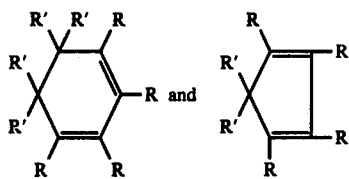

wherein R is selected from the group consisting of hydrogen, methyl, and ethyl radicals, R' is selected from the group consisting of hydrogen, cycloalkyl, aryl, and linear and branched alkyl radicals such that the maximum number of carbon atoms per R' radical is about 6 and the total number of carbon atoms per cyclodiene monomer is in the range of from about 5 to 20;
   (b) units of at least one acyclic conjugated diene;
   (c) optionally, units of a vinyl aromatic compound containing in the range of from about 8 to about 14 carbon atoms per molecule; and wherein the extent of epoxidation of said copolymer, as defined by the ratio of the number of epoxidized groups formed to the number of initial olefinic double bonds, ranges from about 5 to about 80 percent with the further proviso that said block copolymer contains:
   (1) blocks of said 1,3-cyclodiene and blocks of said acyclic conjugated diene when said block copolymer does not contain units of said vinyl aromatic compound and
   (2) blocks of said 1,3-cyclodiene and blocks containing a random arrangement of said acyclic conjugated diene and said vinyl aromatic compound when said copolymer contains units of vinyl aromatic compound.

2. The copolymers of claim 1 wherein the weight ratio of acyclic conjugated diene units to 1,3-cyclodiene units is in the range of from about 99:1 to 1:99.

3. The copolymers of claim 2 wherein the weight ratio of acyclic conjugated diene units to 1,3-cyclodiene units is in the range of from about 95:5 to 40:60.

4. The copolymers of claim 1 wherein the 1,3-cyclodiene is 1,3-cyclohexadiene and said acyclic conjugated diene is butadiene.

5. The copolymer of claim 1 wherein the vinyl aromatic compound is styrene and the weight ratio of acyclic conjugated diene units to styrene units is in the range of from about 100:0 to 50:50.

6. The copolymer of claim 5 wherein the 1,3-cyclodiene is 1,3-cyclohexadiene and said acyclic conjugated diene is butadiene.

7. The copolymer of claim 1 wherein the extent of epoxidation ranges from about 15 to about 60 percent, said 1,3-cyclodiene is 1,3-cyclohexadiene, and said acyclic conjugated diene is butadiene.

8. The copolymer of claim 7 wherein the vinyl aromatic compound is styrene and the weight ratio of 1,3-butadiene to styrene units is from 100:0 to 50:50.

9. A process for improving the green tensile strength, moduli, and oil resistance of block copolymers of 1,3-cyclodienes produced by the polymerization of a mixture comprising a 1,3-cyclodiene and at least one of an acyclic conjugated diene and a vinyl aromatic compound to produce block copolymers having the arrangement defined in claim 1 which comprises:
   (a) reacting an organic peracid with said block copolymer under such conditions that the extent of epoxidation of the 1,3-cyclodiene units in said copolymer, as defined by the ratio of olefinic double bonds modified by the epoxidation reaction to the number of initial double bonds, varies from 5 to 80 percent to produce an epoxidized block copolymer, and
   (b) recovering the epoxidized block copolymer of a 1,3-cyclodiene thus produced having improved green tensile strength, moduli, and oil resistance properties in comparison with the unepoxidized parent copolymer.

10. A process according to claim 9 wherein said reacting in (a) is carried out in solution in a hydrocarbon at a temperature in the range of about −10° C. to about 120° C.

11. A process according to claim 10 wherein said solution is the block copolymer solution as formed during polymerization.

12. A process according to claim 9 wherein the peracid is formed in situ by the addition of hydrogen peroxide, a low molecular weight monocarboxylic acid or acid anhydride, and strong acid catalyst.

13. A process according to claim 9 wherein the block copolymer is formed by the polymerization of 1,3-cyclohexadiene with butadiene and said reacting in (a) is carried out in a hydrocarbon solution of the copolymer in a hydrocarbon boiling in the range of about 35° C. to about 150° C.

14. A process according to claim 9 wherein the block copolymer is formed by the polymerization of 1,3-cyclohexadiene with butadiene and styrene and said reacting in (a) is carried out in a hydrocarbon solution of the copolymer in a hydrocarbon boiling in the range of about 35° C. to about 150° C.

15. A process according to claim 9 wherein said copolymer is in solution in toluene and said peracid is formed in situ by the addition of hydrogen peroxide and formic acid and said reacting is carried out at a temperature in the range of −10° C. to about 120° C.

* * * * *